United States Patent [19]

Vinciguerra

[11] Patent Number: 4,645,083
[45] Date of Patent: Feb. 24, 1987

[54] OVERHEAD TRAVELLING CRANE FOR POWER GAS TURBINE BAYS

[75] Inventor: Costantino Vinciguerra, Florence, Italy

[73] Assignee: Nuovo Pignone S.p.A., Florence, Italy

[21] Appl. No.: 805,417

[22] Filed: Dec. 6, 1985

Related U.S. Application Data

[63] Continuation of Ser. No. 458,893, Jan. 18, 1983, abandoned.

[30] Foreign Application Priority Data

Feb. 5, 1982 [IT] Italy .................... 19470 A/82

[51] Int. Cl.⁴ .................... B66C 5/04; B66C 17/06
[52] U.S. Cl. .................... 212/210; 212/221; 212/209; 294/81.1
[58] Field of Search ........ 104/98; 105/163 R, 163 SK; 294/81 R; 212/205–210, 214–221, 250, 171

[56] References Cited

U.S. PATENT DOCUMENTS

| 756,932 | 4/1904 | Browning | 212/210 |
| 980,321 | 1/1911 | Morgan | 212/210 |
| 2,562,066 | 7/1951 | Scott et al. | 212/250 |
| 3,061,112 | 10/1962 | Bevard | 212/210 |
| 3,389,809 | 6/1968 | Wilson | 212/210 |

FOREIGN PATENT DOCUMENTS

| 1346442 | 2/1974 | United Kingdom | 414/399 |
| 118368 | 3/1957 | U.S.S.R. | 212/210 |
| 485060 | 12/1975 | U.S.S.R. | 212/210 |
| 887435 | 12/1981 | U.S.S.R. | 212/209 |

Primary Examiner—Trygve M. Blix
Assistant Examiner—R. B. Johnson
Attorney, Agent, or Firm—Hedman, Gibson, Costigan & Hoare

[57] ABSTRACT

An overhead travelling crane incorporated into a power gas turbine bay, consisting of a first main load-bearing trolley of length equal to the bay width, which is guided at its ends over the entire length of the bay by two runways fixed to the top of said bay, and a second trolley provided with a winch and slidably supported in a third trolley which is also of length equal to the bay length and is slidably supported by the overlying said first main load-bearing trolley. This latter trolley is provided with cantilever hooking means.

4 Claims, 6 Drawing Figures

OVERHEAD TRAVELLING CRANE FOR POWER GAS TURBINE BAYS

CROSS REFERENCE TO RELATED CASE

This is a continuation application of Ser. No. 458,893, filed on Jan. 18, 1983 now abandoned.

This invention relates to a new type of overhead travelling crane of efficient operation and very small overall vertical height, specifically suitable for complete incorporation into a gas turbine bay.

A power gas turbine is constituted substantially by an air intake casing which supports and feeds the inlet end of a gas generator, of which the other end, namely the outlet end, is rigid with the stator casing of a power turbine rigid with a support cone which itself is supported by being enclosed in an exhaust casing of vertical outlet.

The assembly comprising said gas generator and said power turbine is thus housed in a bay defined between said air intake casing and said exhaust casing.

In order to be able to easily and rapidly replace defective components and/or carry out maintenance operations, it is therefore necessary to use a member which not only grips and supports the separated components, but is also able to carry them out of said bay.

The present state of the art already comprises various methods, one of which provides for using a crane mounted to the side of the gas turbine and acting through the uncovered roof of said bay.

Such a method however gives rise to obvious problems of a practical and economical nature.

In this respect, the installation of an auxiliary crane leads to a considerable time loss, resulting in high costs.

Again, in order to enable the crane arm to function properly, sufficient space must be available, and this is usually not the case. Finally, the crane does not allow easy working when it is necessary to operate inside said support cone, i.e. in an enclosed zone which cannot be reached vertically.

According to a further known method, use is made of an overhead travelling crane incorporated into said bay. Because of the small vertical space available, said known overhead travelling crane simply consists of a main load-bearing trolley or structure which is guided at its two ends by two runways fixed to the top of said bay, and which in its turn acts as a support and runway for a second trolley fitted with a winch or hoist.

Although this method has the advantage of not being bulky in that it represents an appliance which is completely enclosed within the bay, it also has drawbacks, the most important of which is due to the fact that the overhead travelling crane has a fixed gauge which at the most is equal to the depth or width of the bay, so that in order to be able to carry a component to the outside of the bay as is necessary when such a component is to be replaced, a supplementary external outwardly projecting structure has to be installed in order to enable the runway for said winch trolley to be extended to the outside of the bay, and this leads to obvious complications and time loss which negatively affect the economics and practicality of the system. Again in this case it is not possible to operate easily inside the support cone of said turbine.

The object of the present invention is to obviate the aforesaid drawbacks by providing a highly efficient and rational overhead travelling crane of very small overall vertical height which, while being totally incorporated into a power gas turbine bay, enables operations to be also easily carried out in enclosed regions and enables components to be carried to the outside of the bay without having to use supplementary external elements.

This is attained by an overhead travelling crane of extendable gauge which is constituted substantially by three copenetrating and mutually slidable trolleys, of which the main load-bearing trolley is also provided with mobile cantilever means for gripping pieces which cannot be reached vertically.

More specifically, the overhead travelling crane incorporated into a power gas turbine bay, said overhead travelling crane comprising a first main load-bearing trolley of length equal to the bay width, which is guided at its two ends over the entire length of the bay by two runways fixed to the top of said bay, and a second trolley provided with a winch, is characterised according to the present invention in that this latter second winch trolley is slidably supported in a further third trolley which is also of length equal to the bay width and, being situated below and opposing said first main load-bearing trolley, is in its turn supported slidably along this latter, cantilever hooking means being provided mounted on said first main load-bearing trolley. In this manner, by sliding said third trolley along the first, it is possible to lengthen the gauge of the overhead travelling crane at will, and thus prolong the runway for said second winch trolley outside the bay without the need for supplementary structures.

According to a preferred embodiment of the present invention, said first main load-bearing trolley is constituted by a box structure formed from two channel beams which are disposed horizontally, opposing and parallel to each other at a certain distance apart to form an underlying guide slot for said third trolley, and are joined together at their ends by two plates for supporting the trolley running wheels and extending as far as a third channel beam which supports said cantilever hooking means and is disposed parallel to said box structure and further fixed to this latter by strengthening plates.

According to a further fundamental characteristic of the present invention, said third trolley is constituted by a box structure which is formed from two opposing channel beams joined together upperly and of which the lower flanges constitute the runways for said second winch trolley, and which is supported slidably along said first main load-bearing trolley by means of a block which is fixed to the top of the structure on the transverse centre line thereof, is inserted into said guide slot of said first main load-bearing trolley, and rotatably supports two running wheels cooperating with the lower flanges of the channel beams of said first main load-bearing trolley, and is also supported by means of a second block which is fixed to the top of the structure in proximity to one end thereof, is also inserted into said guide slot, and rotatably supports the other two running wheels cooperating with said lower flanges of the channel beams of the first trolley, together with two further running wheels cooperating with the upper flanges of said channel beams of the first main load-bearing trolley.

In this manner said third trolley is guided reliably along the first load-bearing carriage without any possibility of it rotating, and it can therefore support said second winch trolley in a cantilever manner outside the bay without any danger of tilting.

According to a further preferred embodiment of the invention, said second trolley is provided with a hydraulic piston for operating the cables of the winch, of which the pulley is made to act in an intermediate region between the two pairs of running wheels of the trolley.

In this manner it is possible to support any load without the danger of tilting the winch trolley, because of the fact that the load is not cantilever-supported.

Finally, according to a further fundamental characteristic of the present invention, said cantilever hooking means consist of a cross-shaped hooking member having the ends of its two horizontal arms respectively hinged to the ends of two connecting rods, the other ends of which are hinged to a support block fixed to said third channel beam and to said strengthening plates of said first main load-bearing trolley, said connecting rods being retained in a predetermined angular position by corresponding length-adjustable tie rods hinged between said connecting rods and said support block, a centering system comprising two length-adjustable tie rods being hinged between said support block and the end of the upper vertical arm of the cross-shaped member.

In this manner, by acting on said adjustable tie rods it is possible to rotate said connecting rods and consequently displace the cross-shaped hooking member axially forwards, i.e. to a more projecting extent, it being prevented from rotating about the axis on which it is hinged to said connecting rods, by said centering system comprising two tie rods.

The cantilever hooking means is secured to an overhead supporting block after the gas generator has been removed from the turbine bay. The cantilever hooking means is intended for gripping turbine pieces which cannot be reached by a vertical crane. In the power turbine bay, the hooking means is attached to the power turbine for withdrawing it from the exhaust casing. Conventional vertical crane and pulley devices are incapable of extracting the power gas turbine from the exhaust casing because they cannot be positioned above the turbine.

The invention will be more apparent with reference to the accompanying drawings which illustrate a preferred embodiment thereof given by way of non-limiting example in that technical and constructional modifications can be made thereto within the scope of the inventive idea.

Figure 1:
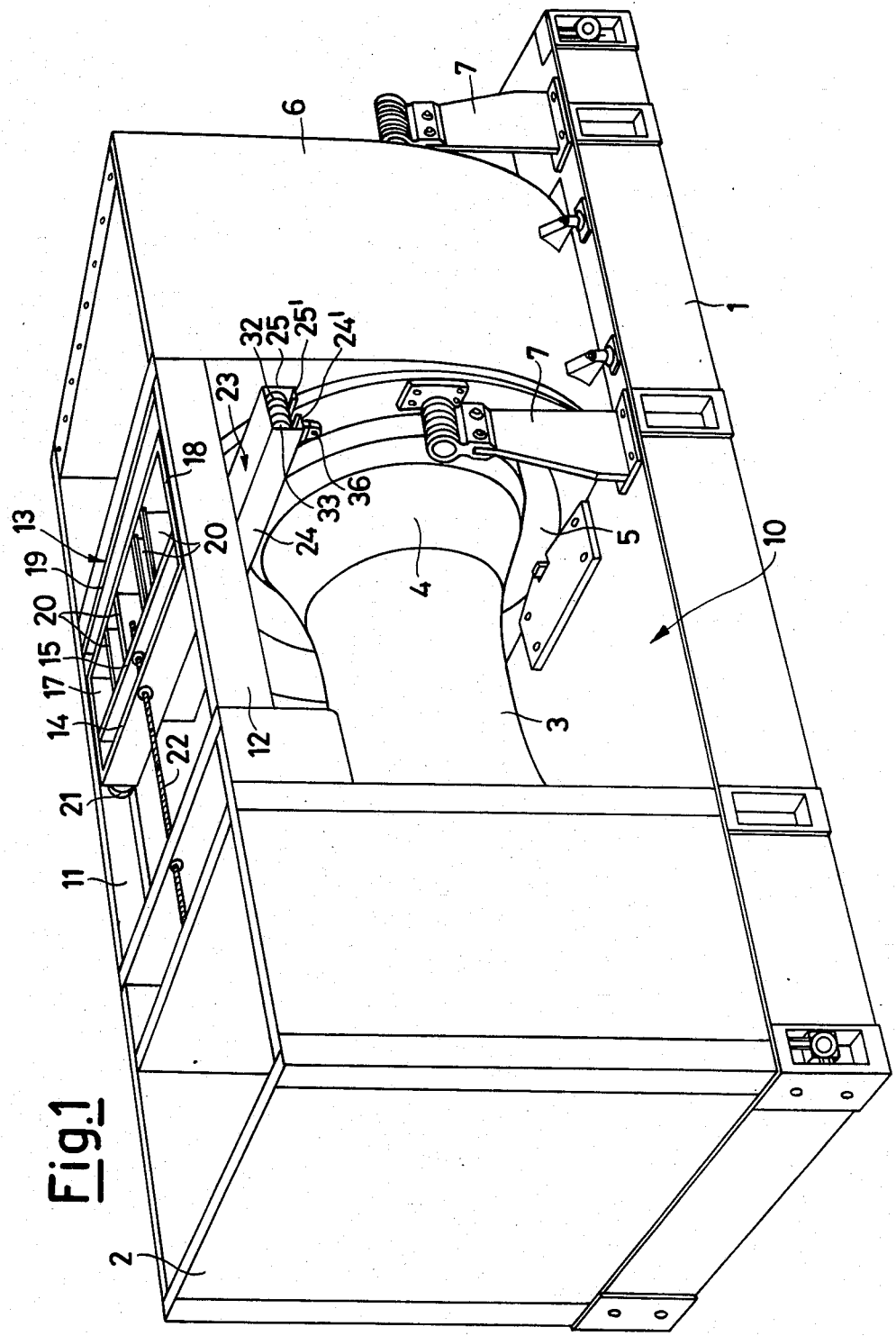
FIG. 1 is a perspective view of a power gas turbine comprising an overhead travelling crane according to the invention.

In the figures, the reference numeral 1 indicates the base of a power gas turbine, on which is mounted the air intake casing 2 which supports and feeds the inlet end of a gas generator 3, of which the other end, namely the outlet end, is rigid with the stator casing of a power turbine 4 which in its turn is rigid with a support cone 5 supported by and enclosed in an exhaust casing of vertical outlet 6.

Said exhaust casing 6 is mounted on the base 1 by way of four flexible legs 7 (only two legs are visible in FIG. 1, the others being in an opposing position with respect to the longitudinal axis of the turbine) and is connected at its top to the top of the air intake casing 2 by means of two connecting channel beams 11 and 12 respectively. In this manner, a bay 10 is defined which houses the assembly constituted by the gas generator 3 and power turbine 4, while the opposing flanges of said two channel beams 11 and 12, which extend into the bay 10 over the entire length of this latter, constitute the two runways for the first main load-bearing trolley of an overhead travelling crane 13.

Said first main load-bearing trolley of the overhead travelling crane 13 is constituted substantially by a box structure formed from two channel beams 14 and 15 which are disposed horizontally and parallel and opposing each other at a certain distance apart to form an underlying guide slot 16, have a length equal to the width of the bay 10, and are joined together at their ends by two plates 17 and 18 respectively, which extend as far as a third channel beam 19 which is disposed parallel to the beams 14 and 15 and is further fixed to this latter beam by strengthening plates 20. Said side plates 17 and 18 also support the four running wheels 21 of said main load-bearing trolley, which is driven over the entire length of the bay 10 by the action of the worm 22.

Said first main load-bearing trolley supports slidably along it an underlying trolley 23 which is also of length equal to the length of the bay 10 and is constituted by a box structure formed substantially from two channel beams 24 and 25 respectively, which are disposed in opposing positions and joined together upperly.

Figure 3:
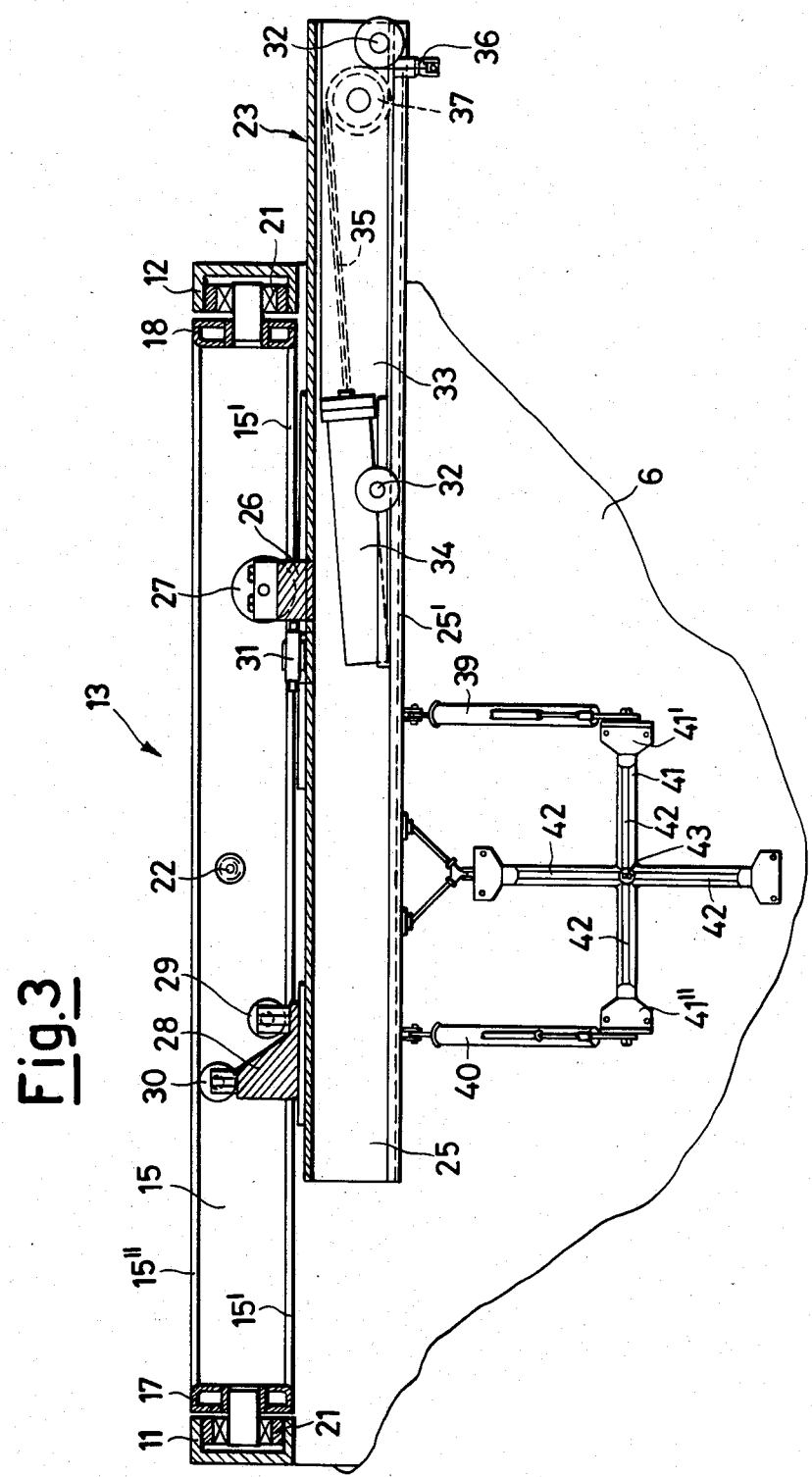
FIG. 3 is a partial lateral section through the turbine on the line AA of FIG. 2.

Said trolley 23 is slidably supported by way of a block 26 which is fixed to the top of the trolley on the transverse centre line of this latter (see specifically FIG. 3), is inserted into said guide slot 16 of the first main load-bearing trolley 14–20, and rotatably supports two running wheels 27′ and 27 which rest and slide respectively on the lower flanges 14′ and 15′ of the two channel beams 14 and 15 of said first main load-bearing trolley 14–20, and is further slidably supported by way of a second block 28 of trapezoidal cross-section which is also fixed to the top of the trolley in proximity to one end thereof and is inserted into said guide slot 16 to rotatably support two running wheels 29′ and 29 which rest and slide respectively on said lower flanges 14′ and 15′, and a further two running wheels 30′ and 30 which cooperate respectively with the upper flanges 14″ and 15″ of said two channel beams 14 and 15 of said first main load-bearing trolley 14–20.

Figure 2:
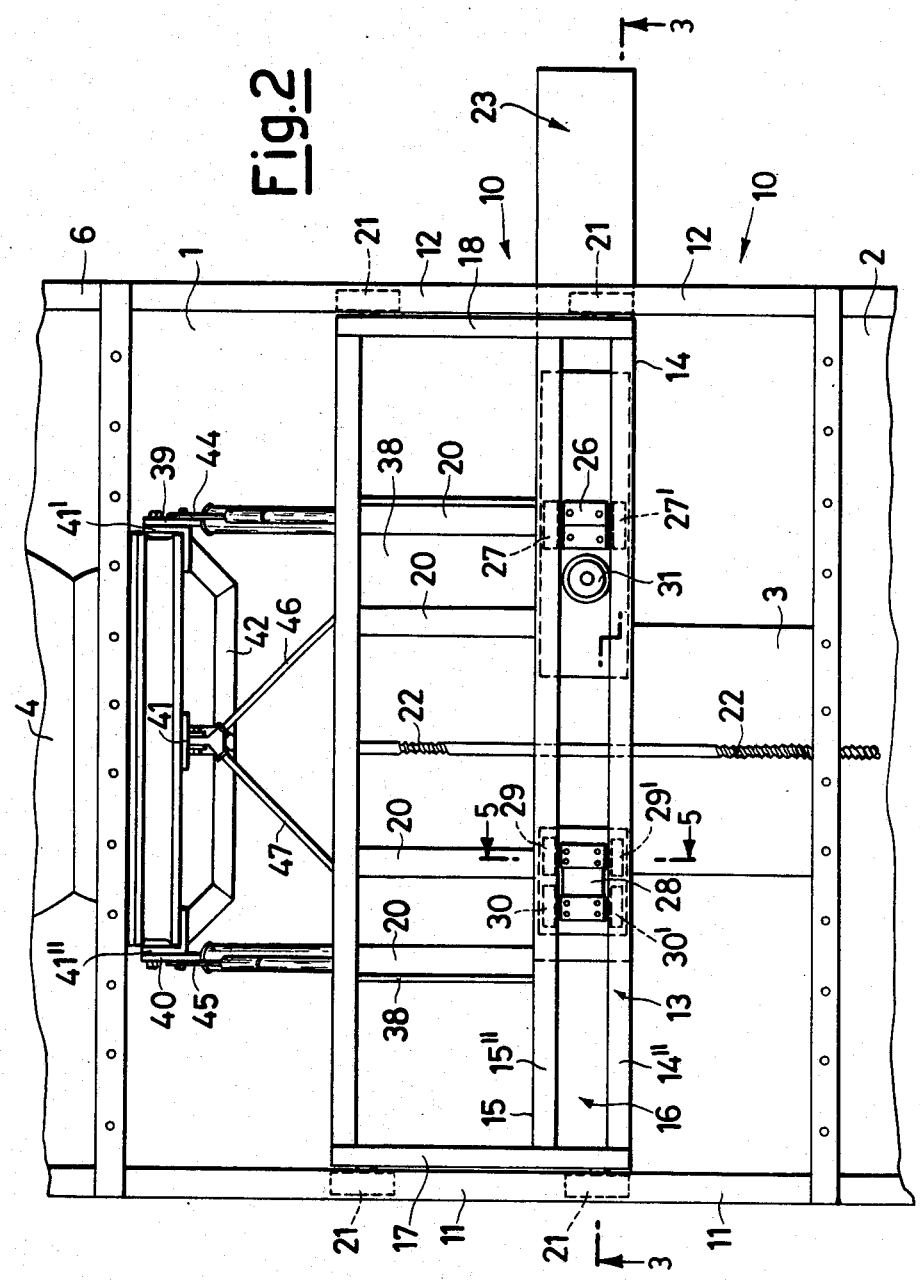
FIG. 2 is a partial plan view of the turbine of FIG. 1 to an enlarged scale.

On the top of the trolley 23 and in proximity to its transverse centre line (see specifically FIGS. 2 and 3) there is also rotatably mounted a roller 31 of vertical axis which cooperates with the edges of said guide slot 16 in order to guide the trolley 23 during its sliding along the first main load-bearing trolley 14–20.

Figure 5:
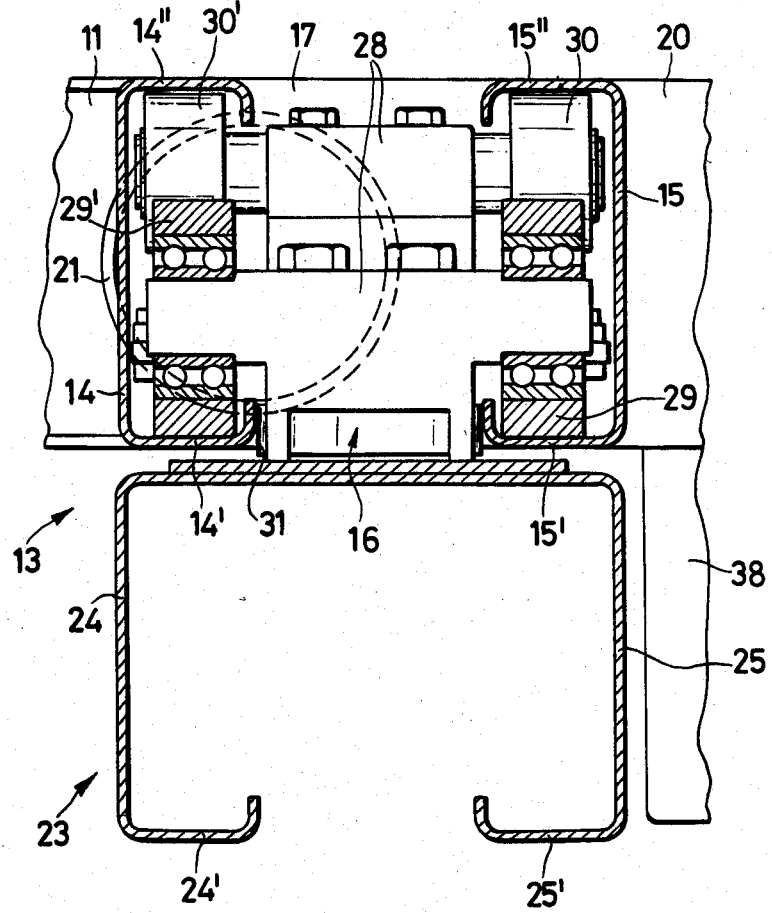
FIG. 5 is a section through the overhead travelling crane on the line BB of FIG. 2 to a greatly enlarged scale.
Figure 6:
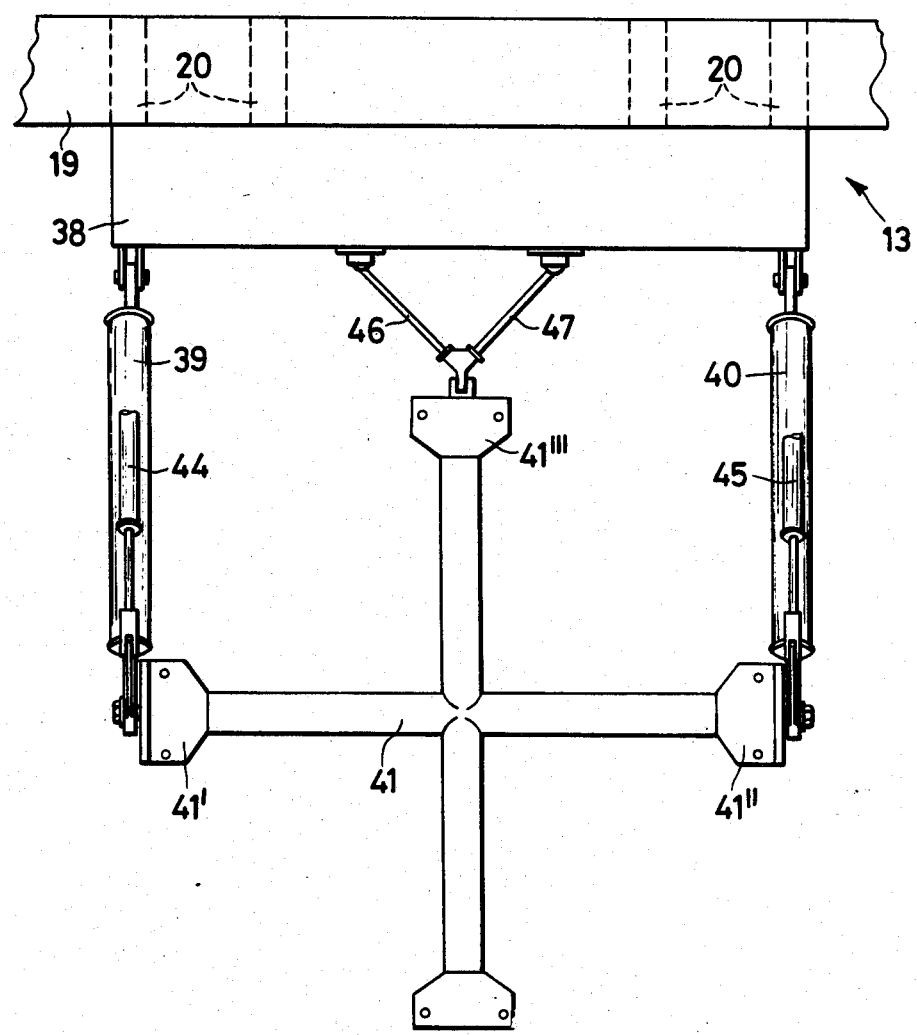
FIG. 6 is a partial side view of the overhead travelling crane on the line CC of FIG. 4.

The two lower flanges 24′ and 25′ (see specifically FIG. 5) of the two channel beams forming the trolley 23 constitute the two runways for the four wheels 32 of a winch trolley 33 which can slide within said trolley 23.

Said winch trolley 33 is provided with a hydraulic piston 34 for operating the cables 35 which control the hook 36 of the winch, of which the pulley 37 acts between the two pairs of wheels of the winch trolley 33.

Finally, to said third channel beam 19 and to said strengthening plates 20 of said first main load-bearing trolley 14-20, there is lowerly fixed a support block 38 to which the ends of two connecting rods 39 and 40 are hinged, their other ends being hinged to the ends 41' and 41" of the two horizontal arms of a cross-shaped hooking member 41.

Figure 4:
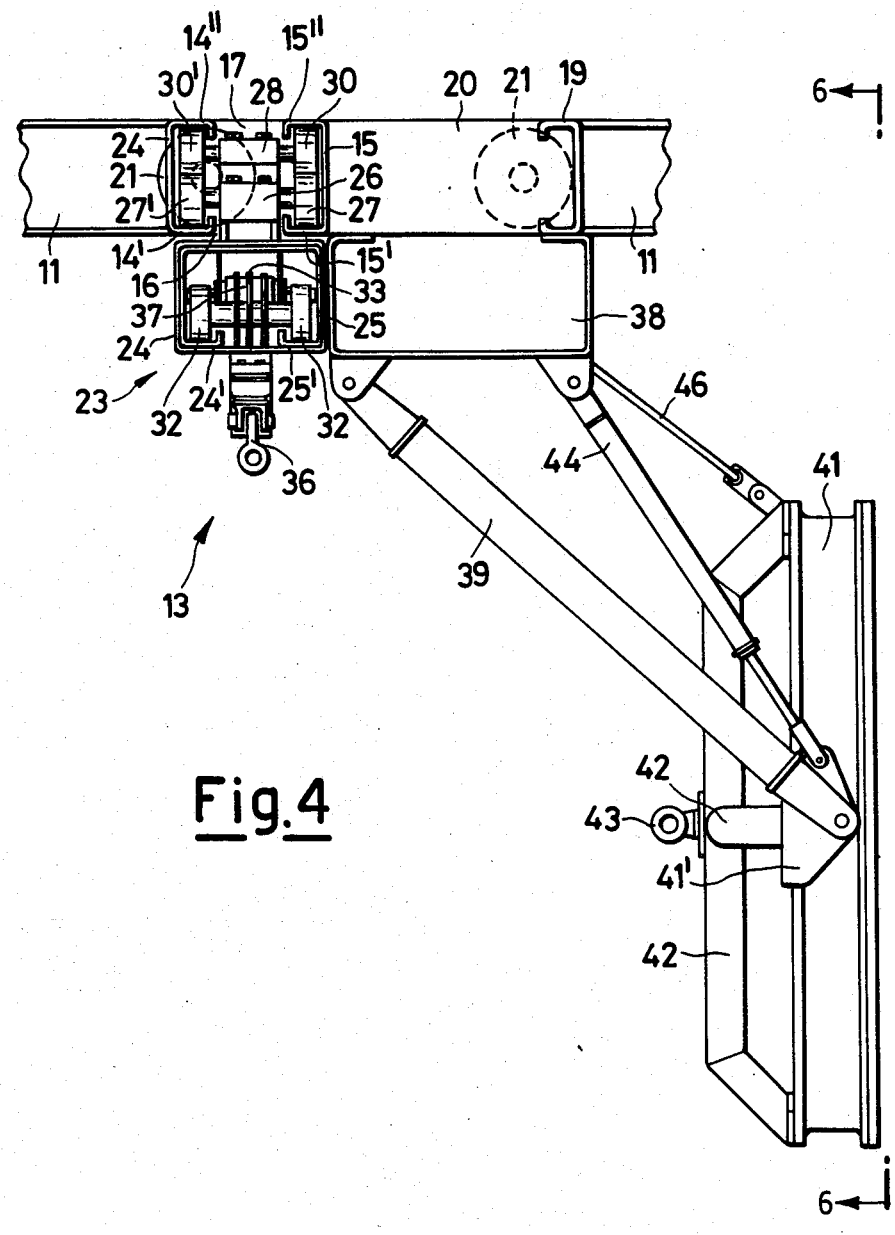
FIG. 4 is a partly sectional front view of the overhead travelling crane of FIG. 1 to an enlarged scale.

Said cross-shaped member 41, which is provided with strengthening ribs 42 and a support ring 43, is kept projecting in a predetermined angular position (see specifically FIG. 4) by the action of two corresponding length-adjustable tie rods 44 and 45 which are hinged between said support block 38 and said two ends 41' and 41" of the cross-shaped member 41, and any rotation of the cross-shaped member about the axis on which it is hinged to said connecting rods 39, 40 is prevented by a centering system constituted by two length-adjustable tie rods 46 and 47 hinged between said support block 38 and the end 41'" of the upper vertical arm of the cross-shaped hooking member 41.

I claim:

1. An overhead travelling crane positioned about the periphery of a power gas turbine bay defined by a length and a width, comprising:
   (a) two runways affixed to the top of the bay, extending along the length of the bay and on either side of the bay;
   (b) a first main load-bearing trolley extending along the width of the bay and being supported at either end by said two runways on running wheels so as to enable said first trolley to traverse the length of the bay;
   (c) a second winch trolley having load bearing cables and slidably supported on two pairs of running wheels within a third trolley, said third trolley being parallel to and slidably supported along said first main load-bearing trolley;
   (d) means for raising and lowering a load attached to said load bearing cables of said second winch trolley;
   (e) a diagonally projecting hooking means mounted to said first main load-bearing trolley, said hooking means comprises a cross-shaped hooking member having the ends of its two horizontal arms respectively hinged to the ends of two connecting rods, the other ends of which are hinged to a support block fixed to a channel beam mounted on said first main load-bearing trolley, said connecting rods being retained in a predetermined angular position by corresponding length-adjustable tie rods hinged between said connecting rods and said support block, and a centering system comprising two length-adjustable tie rods being hinged between said support block and the upper end of the vertical arm of said cross-shaped member.

2. An overhead travelling crane as claimed in claim 1, wherein said first main load-bearing trolley comprises three channel beams, the open sides of two of said channel beams opposing and parallel to each other, said two channel beams being further joined by a plate at each end of said two channel beams so as to maintain a horizontal slot between each of said two channel beams for guiding and supporting said third trolley, said plates further extending and joining said third channel beam disposed parallel to said two channel beams.

3. An overhead travelling crane as claimed in claim 2, wherein said third trolley comprises a box structure having two additional channel beams, the open sides of said additional channel beams opposing end parallel to each other, and joined together on top, the bottom sides of said additional channel beams providing runways for said winch trolley, said third trolley being supported slidably along said first main load-bearing trolley by means of a block which is affixed to the top of said third trolley on the transverse center line thereof and inserted into said guide slot of said first main load-bearing trolley which rotatably supports a first set of running wheels cooperating with the bottom sides of said channel beams of said first main load-bearing trolley, said third trolley being also supported by the means of a second block which is fixed to the top of said third trolley in proximity to one end thereof and inserted into said guide slot of said first main load-bearing trolley said second block rotatably supporting a second set of running wheels cooperating with said bottom sides of said channel beams of said first trolley, together with a third set of running wheels cooperating with the top sides of said channel beams of said first main load-bearing trolley.

4. An overhead travelling crane as claimed in claim 1, wherein said means for raising and lowering a load comprises a hydraulic piston and pulley for operating said cables of said winch, said pulley positioned in the region between the two pairs of running wheels of said second winch trolley.

* * * * *